US011445076B2

(12) United States Patent
Sumi

(10) Patent No.: US 11,445,076 B2
(45) Date of Patent: Sep. 13, 2022

(54) IMAGE PROCESSING APPARATUS AND METHOD FOR CONTROLLING IMAGE PROCESSING APPARATUS

(71) Applicant: CANON KABUSHIKI KAISHA, Tokyo (JP)

(72) Inventor: Taiki Sumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/410,920

(22) Filed: Aug. 24, 2021

(65) Prior Publication Data

US 2022/0070315 A1 Mar. 3, 2022

(30) Foreign Application Priority Data

Aug. 31, 2020 (JP) .............................. JP2020-145981

(51) Int. Cl.
*H04N 1/00* (2006.01)

(52) U.S. Cl.
CPC ..... *H04N 1/00506* (2013.01); *H04N 1/00408* (2013.01); *H04N 1/00352* (2013.01)

(58) Field of Classification Search
CPC ........... H04N 1/00506; H04N 1/00408; H04N 1/00352; H04N 1/00413; H04N 1/00517; G06F 3/1204
See application file for complete search history.

(56) References Cited

U.S. PATENT DOCUMENTS

| | | | | |
|---|---|---|---|---|
| 2011/0051165 | A1* | 3/2011 | Yamada | H04N 1/00413 358/1.15 |
| 2017/0070625 | A1* | 3/2017 | Yee | H04N 1/00482 |
| 2018/0183952 | A1* | 6/2018 | Imaoka | H04N 1/00411 |
| 2021/0203796 | A1* | 7/2021 | Sakai | G03G 15/5025 |
| 2021/0203798 | A1* | 7/2021 | Ito | H04N 1/00517 |
| 2021/0279022 | A1* | 9/2021 | Kaneda | G06F 3/1292 |

FOREIGN PATENT DOCUMENTS

JP 2002132100 A 5/2002

* cited by examiner

*Primary Examiner* — Iriana Cruz
(74) *Attorney, Agent, or Firm* — Canon U.S.A., Inc. IP Division

(57) ABSTRACT

A user can register a job execution button with frequently used settings reflected therein to a menu screen. However, the registration requires the user to perform a predetermined operation, which takes time and effort of the user. Thus, if the same setting change is made to a button a predetermined number of times or more, a button with the setting change reflected therein is newly generated.

14 Claims, 9 Drawing Sheets

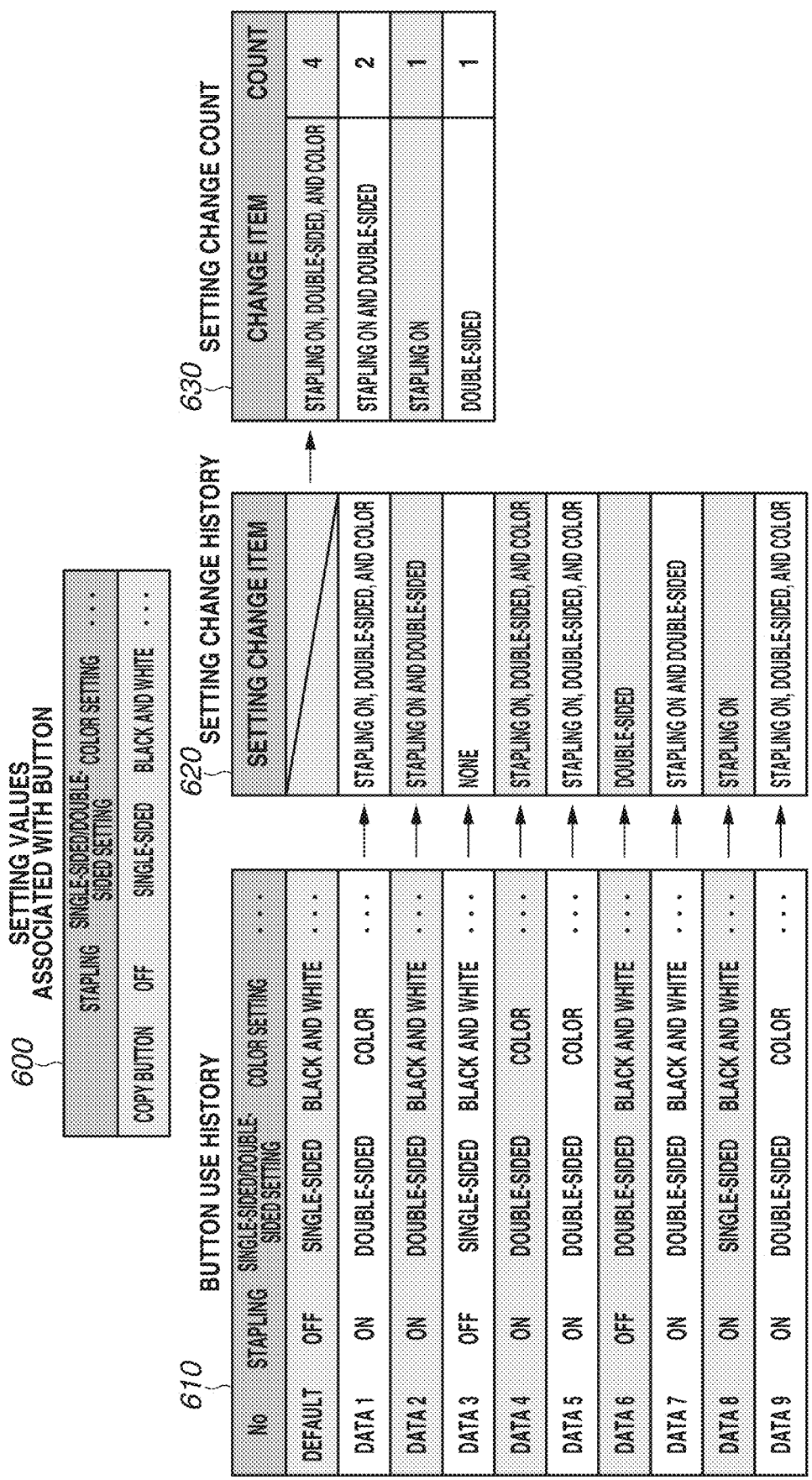

FIG.8

810 BUTTON USE HISTORY

| No | DATE AND TIME | STAPLING | SINGLE-SIDED/DOUBLE-SIDED SETTING | COLOR SETTING | ... |
|---|---|---|---|---|---|
| DEFAULT | | OFF | SINGLE-SIDED | BLACK AND WHITE | ... |
| DATA 1 | 2020/4/3 | ON | DOUBLE-SIDED | COLOR | ... |
| DATA 2 | 2020/4/4 | ON | DOUBLE-SIDED | BLACK AND WHITE | ... |
| DATA 3 | 2020/5/3 | OFF | SINGLE-SIDED | BLACK AND WHITE | ... |
| DATA 4 | 2020/5/3 | ON | DOUBLE-SIDED | COLOR | ... |
| DATA 5 | 2020/5/4 | ON | DOUBLE-SIDED | BLACK AND WHITE | ... |
| DATA 6 | 2020/5/5 | OFF | DOUBLE-SIDED | BLACK AND WHITE | ... |
| DATA 7 | 2020/5/6 | ON | DOUBLE-SIDED | BLACK AND WHITE | ... |
| DATA 8 | 2020/5/7 | ON | SINGLE-SIDED | BLACK AND WHITE | ... |
| DATA 9 | 2020/5/7 | ON | DOUBLE-SIDED | COLOR | ... |

820 SETTING CHANGE HISTORY

| SETTING CHANGE ITEM | DATE AND TIME |
|---|---|
| STAPLING ON, DOUBLE-SIDED, AND COLOR | 2020/4/3 |
| STAPLING ON AND DOUBLE-SIDED | 2020/4/4 |
| NONE | 2020/5/3 |
| STAPLING ON, DOUBLE-SIDED, AND COLOR | 2020/5/3 |
| STAPLING ON, DOUBLE-SIDED, AND COLOR | 2020/5/4 |
| DOUBLE-SIDED | 2020/5/5 |
| STAPLING ON AND DOUBLE-SIDED | 2020/5/6 |
| STAPLING ON | 2020/5/7 |
| STAPLING ON, DOUBLE-SIDED, AND COLOR | 2020/5/7 |

630 SETTING CHANGE COUNT

| CHANGE ITEM | COUNT |
|---|---|
| STAPLING ON, DOUBLE-SIDED, AND COLOR | 3 |
| STAPLING ON AND DOUBLE-SIDED | 1 |
| STAPLING ON | 1 |
| DOUBLE-SIDED | 1 |

IMAGE PROCESSING APPARATUS AND METHOD FOR CONTROLLING IMAGE PROCESSING APPARATUS

BACKGROUND

Field of the Disclosure

The present disclosure relates to an image processing apparatus including an operation unit, and a method for controlling an image processing apparatus.

Description of the Related Art

In recent years, an image processing apparatus equipped with a scanner and a printer has been able to display a menu screen including arranged buttons for executing a job such as scanning and printing on an operation unit thereof. A user can instruct such an image processing apparatus to execute the job by pressing the button for executing the job on the menu screen displayed, for example, after the user logs in to the image processing apparatus.

When the above-described button is pressed, a setting screen is opened in a state where setting values associated with the button are reflected therein, and the user can cause the image processing apparatus to execute the job after the user changes some of the setting values as necessary. Further, there is disclosed a method for allowing a user to newly create a button with desired settings associated therewith and additionally register the button to the menu screen by manually performing predetermined registration work after the user makes the desired settings on the setting screen (Japanese Patent Application Laid-Open No. 2002-132100). The user can perform the processing represented by the button with the desired settings by operating the registered button after the button with the desired settings associated therewith is registered to the menu screen.

However, by the conventional method, the user has to take time and effort of manually registering the button to use the button with the desired settings associated. therewith. Further, there is a possibility that some users may be unaware that a button can be registered in association with desired settings. If such a user, who is unaware that the button can be registered, unconsciously repeats the same setting change each time the job is executed, the user has to take time and effort each time.

SUMMARY

The present disclosure is directed to providing a method that allows a user who is unaware that a button can be registered to use a display object with desired settings associated therewith without taking time and effort.

According to an aspect of the present disclosure, an image processing apparatus includes at least one processor and at least a memory coupled to the at least one processor and. having instructions stored thereon, and when executed by the at least one processor, acting as: a display control unit configured to display a display object on an operation screen, the display object being used to receive an instruction to perform processing, the display object being a display object with a setting value associated therewith, a processing unit configured to perform the processing based on the setting value associated with the display object in a case where the instruction to perform the processing corresponding to the display object is issued, a storage unit configured to store history information indicating a history of execution of the processing, the history information including at least information indicating the changed setting value in a case where part of the setting value associated with the display object is changed and the processing is performed based on the changed setting value, and a control unit configured to, in a case where a number of times the setting value is changed indicated by the history information stored in the storage unit satisfies a predetermined condition, reflect the setting value in the setting value associated with the display object, and newly display, on the operation screen, a display object with which the setting value after reflection is associated.

Further features of the present disclosure will become apparent from the following description of exemplary embodiments with reference to the attached drawings.

BRIEF DESCRIPTION OF THE DRAWINGS

FIG. 6 is a table illustrating a setting change history of a copy button.

FIG. 8 is a table illustrating a setting change history of the copy button according to one or more aspects of the present disclosure.

DESCRIPTION OF THE EMBODIMENTS

In the following description, exemplary embodiments for implementing the present disclosure will be described with reference to the drawings. The following exemplary embodiments are not intended to limit the disclosure set forth in the claims, and not all combinations of features described in the exemplary embodiments are necessarily essential to a solution of the present disclosure. The following exemplary embodiments will be described using an image processing apparatus as an example of an information processing apparatus.

Figure 1:
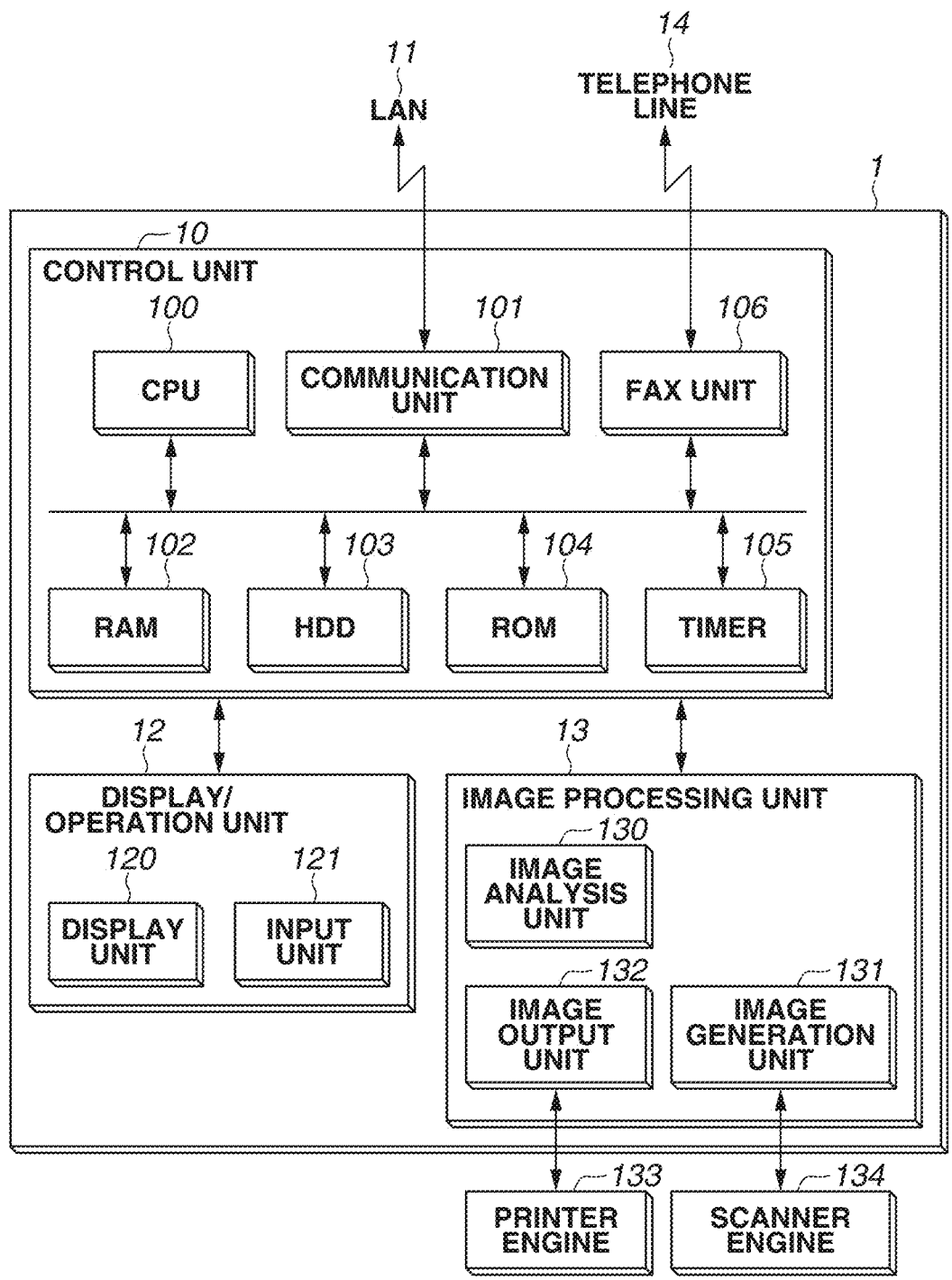
FIG. 1 is a diagram illustrating a configuration of an image processing apparatus according to one or more aspects of the present disclosure.

FIG. 1 is a block diagram illustrating a configuration of an image processing apparatus 1 according to a first exemplary embodiment of the present disclosure.

The image processing apparatus I will be described below, for example, as a multifunction peripheral having a print function and a scan function, but the image processing apparatus 1 may be an apparatus having only a single function. The image processing apparatus 1 includes a control unit 10, a display/operation unit 12, and an image processing unit 13.

The control unit 10 controls operation of each unit in the image processing apparatus 1. The control unit 10 includes a central processing unit (CPU) 100, a communication unit 101, a random access memory (RAM) 102, a hard disk drive (HDD) 103, a read only memory (ROM) 104, a timer 105, and a facsimile (FAX) unit 106, and can be connected to a local area network (LAN) 11 and a telephone line 14.

The CPU 100 controls the entire control unit 10. The LAN 11 indicates a network for exchanging data between the image processing apparatus 1 and an external apparatus, and the image processing apparatus 1 is connected to the Internet via the LAN 11. The communication unit 101 transmits and receives data via the LAN 11. The RAM 102 provides a system work memory that allows the CPU 1.00 to operate. The HDD 103 is a hard disk drive, and may be a storage medium such as a magnetic disk, an optical medium, and a flash memory. The HDD 103 can store document data, setting data, and the like therein. Alternatively, the document data, the setting data, and the like do not have to be stored in the image processing apparatus 1 and may be stored in an external server or personal computer (PC) connectable to the image processing apparatus 1 via the network. The ROM 104 is a boot ROM, and stores a boot program of the system therein. The CPU 100 loads a program installed in the HDD 103 or the like into the RAM 102 using the boot ROM of the ROM 104, and performs various kinds of control based on the program. The timer 105 measures a time as designated by the CPU 100, and notifies the CPU 100, by interruption or the like, that the designated time has elapsed. The FAX unit 106 transmits and receives fax data via the telephone line 14.

The display/operation unit 12 is controlled by the control unit 10, and includes a display unit 120 and an input unit 121. The display unit 120 is a display for displaying an operation screen of the image processing apparatus 1 to a user. The input unit 121 receives an input from the user via an interface such as a touch panel, a mouse, a camera, an audio input, and a keyboard.

The image processing unit 13 is controlled by the control unit 10, and includes an image analysis unit 130, an image generation unit 131, and an image output unit 132. The image analysis unit 130 analyzes a structure of an image on a document, and extracts required information from an analysis result. The image generation unit 131 reads (for example, scans) the document to thus digitize the image on the document and generate image data, and stores the image data into the HDD 103. Further, the image generation unit 131 can also generate document image data in another format using the information analyzed by the image analysis unit 130. The image output unit 132 outputs the image data stored in the HDD 103. Examples of the output include printing the document image data on paper, transmitting the document image data to an external device, a server, a facsimile apparatus, or the like connected to the network via the communication unit 101, and storing the document image data in a storage medium connected to the image processing apparatus 1.

Figure 2:
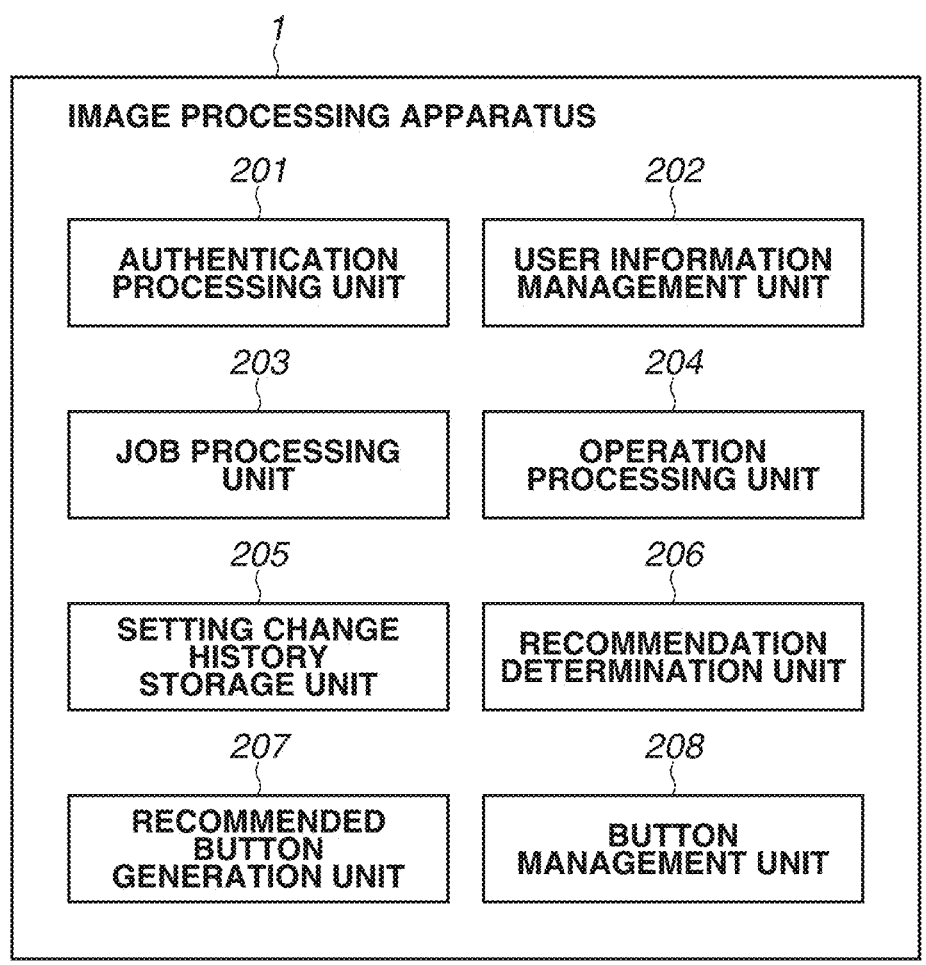
FIG. 2 is a block diagram illustrating an example of functions of the image processing apparatus.

FIG. 2 is a block diagram illustrating an example of functions of the image processing apparatus 1 illustrated in FIG. 1. The image processing apparatus 1 includes an authentication processing unit 201, a user information management unit 202, a job processing unit 203, an operation processing unit 204, a setting change history storage unit 205, a recommendation determination unit 206, and a recommended button generation unit 207, as functional units thereof. The CPU 100 loads the program installed in the HDD 103 into the RAM 102 using the boot ROM of the ROM 104, and each of the functional units is a function implemented based on the program.

The authentication processing unit 201 performs processing for a login/logout received from the user. Upon receiving inputs of a user identification (ID) and a password from the user, the authentication processing unit 201 carries out authentication based on the received information. Then, if the authentication is successful, processing associated in advance with the authenticated user is performed.

The user information management unit 202 manages information regarding the user subjected to the authentication by the authentication processing unit 201 user by user. For example, the user information management unit 202 can switch a used language for each user by managing the used language when the user uses the image processing apparatus 1 (for example, English or Japanese). Further, the user information management unit 202 can manage a print job received from the external apparatus via the communication unit 101 for each user who has input the job. Further, the user information management unit 202 manages an initial screen displayed when the user starts operating the image processing apparatus 1 for each user. The user information management unit 202 manages, for example, a screen set as the initial screen and a display order of buttons displayed on the initial screen.

The job processing unit 203 processes various kinds of jobs to be executed by the image processing apparatus 1. More specifically, the job processing unit 203 executes a scan job by controlling the image generation unit 131, executes a print job by controlling the image output unit 132, and executes a transmission job by controlling the communication unit 101.

The operation processing unit 204 displays various kinds of information to the user by controlling the display unit 120. Further, the operation processing unit 204 receives and processes an operation instruction from the user that is input via the input unit 121.

The setting change history storage unit 205 extracts setting change history information from information about the job processed by the job processing unit 203 and stores the setting change history information. More specifically, when the user executes the job after the user changes the setting values with respect to a button for executing the job that is displayed on the menu screen, the setting change history storage unit 205 stores information regarding the changed setting values.

The recommendation determination unit 206 determines whether a criterion for generating a recommended button, which will be described below, is satisfied based on the setting change history information stored in the setting change history storage unit 205. As will be used herein, the term recommendation refers to estimating settings desired by the user and recommending a button with which the settings desired by the user are associated to the user based on the estimated result. in the present exemplary embodiment, settings that the user uses many times are estimated to be the settings desired by the user.

The recommended button generation unit 207 generates the recommended button based on a result of determination by the recommendation determination unit 206. If the same setting change is made to a button the predetermined number of times or more in executing a job, the recommended button generation unit 207 newly generates a button (hereinafter referred to as the recommended button) registered in association with setting values that is acquired by reflecting the setting change in the setting values associated with the button. Then, the generated recommended button is displayed on the menu screen. A button management unit 208 manages information regarding a custom button (details thereof will be described below) displayed on the menu screen of the image processing apparatus 1 and the recommended button generated by the recommended button generation unit 207, and displays the button specific to the user on the menu screen in cooperation with the user information management unit 202. The button management unit 208 manages information about, for example, the setting values associated with the button.

Figure 3:
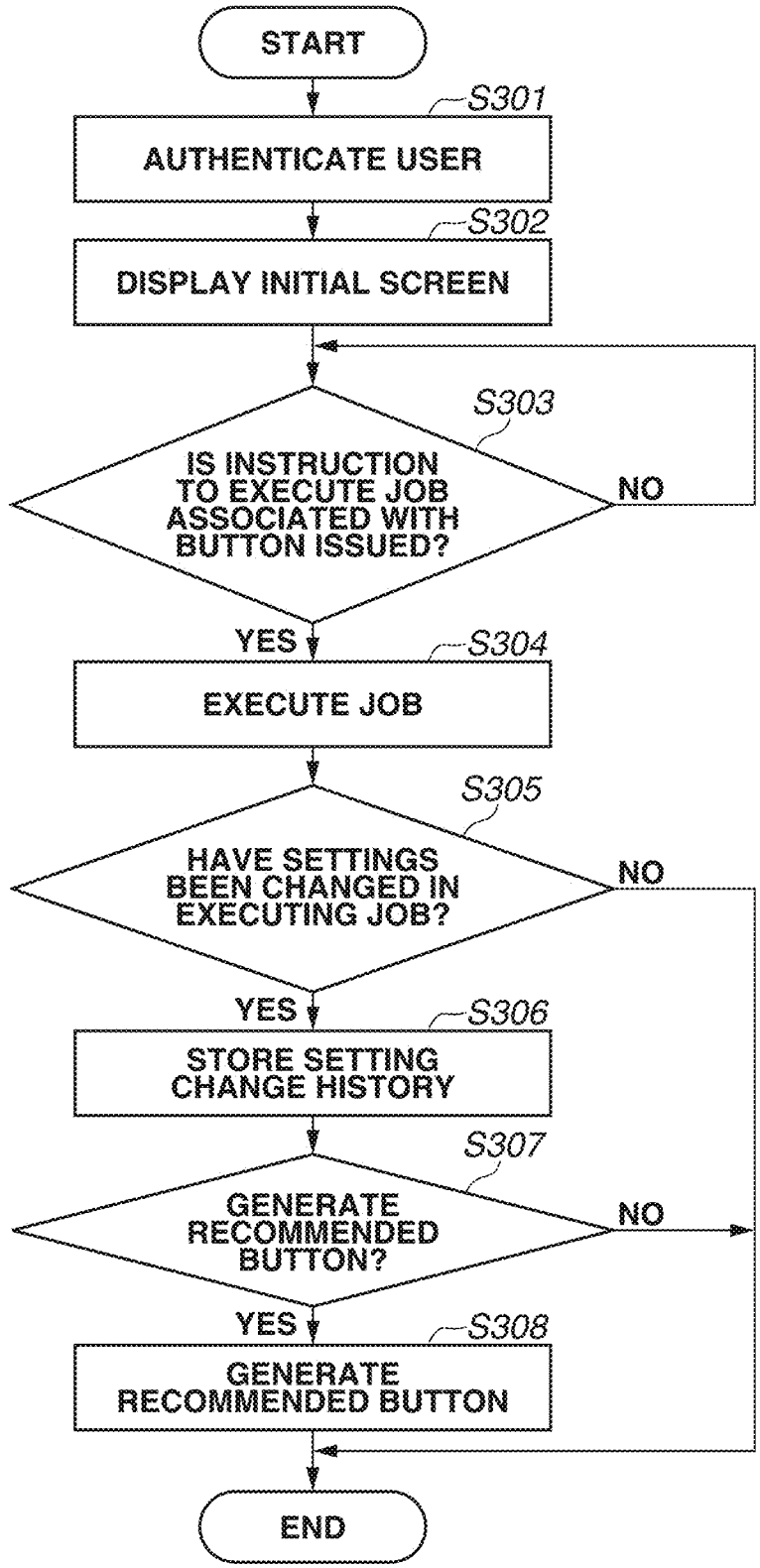
FIG. 3 is a flowchart illustrating a procedure for generating a recommended button performed by the image processing apparatus.

FIG. 3 is a flowchart illustrating processing from a startup of the image processing apparatus 1 to generation and display of the recommended button according to the present exemplary embodiment. Each processing procedure in the flowchart illustrated in FIG. 3 is implemented by the CPU 100 included in the image processing apparatus 1 executing a control program.

In step S301, the authentication processing unit 201 carries out the user authentication upon receiving a login request from the user. A login screen is displayed on the display unit 120, and the user inputs the user ID and the password via the input unit 121, whereby the login request is issued.

The image processing apparatus 1 may be configured in such a manner that the login request is issued based on an input from an integrated circuit (IC) card reader or a biometric authentication device such as a fingerprint authentication device connected to the input unit 121 of the image processing apparatus 1. Upon receiving the login request, the authentication processing unit 201 carries out the authentication by checking the input username and password against the username and password stored in the HDD 103 in advance.

In step S302, the operation processing unit 204 displays the initial screen with the information about the authenticated user reflected therein on the display unit 120. The initial screen according to the present exemplary embodiment refers to a screen presented to the user immediately after the login to the image processing apparatus 1 and is the menu screen that displays thereon buttons for instructing the image processing apparatus 1 to execute a job.

Figure 4:
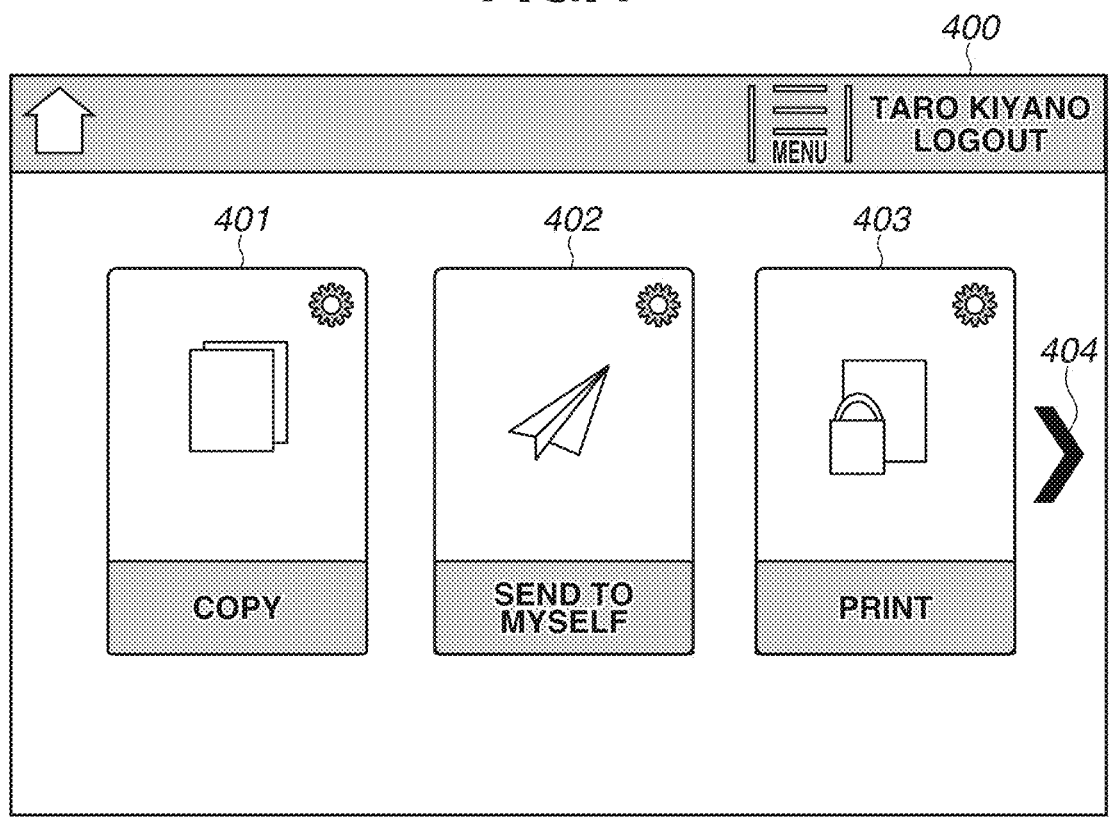
FIG. 4 is a diagram illustrating an example of an operation screen of the image processing apparatus after a login.

FIG. 4 illustrates an example of the initial screen. A plurality of display objects for instructing the image processing apparatus 1 to execute the job, such as a copy button 401, a send-to-myself button 402, and a print button 403, is displayed on an initial screen 400. Each display object displayed on the initial screen 400 is referred to as a button herein, and the button may also include display objects in various forms such as an operation key, without being limited to the button. A page transition button 404 is a button for transitioning to the next screen, and when the page transition button 404 is pressed, a button on the next page is displayed. The displayed button can be changed and can be customized for each user. When the copy button 401 is pressed, the screen transitions to a setting screen for executing the copy job.

Figure 5A:
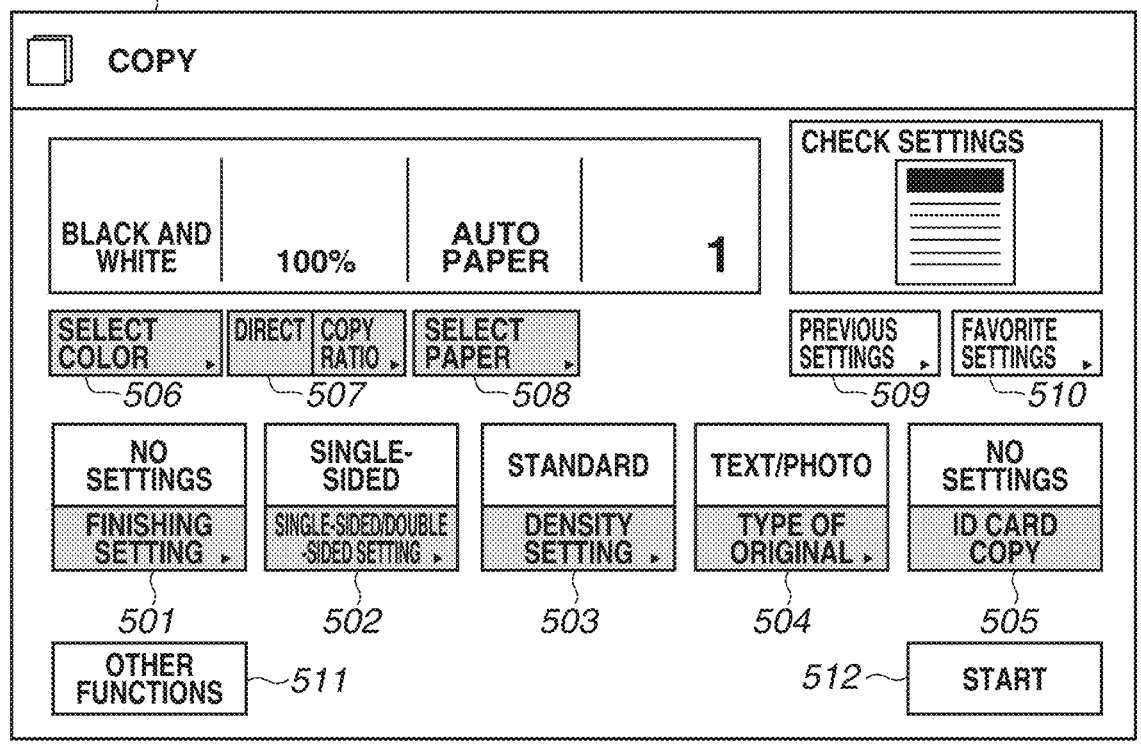
FIGS. 5A and 5B are diagrams each illustrating an example of a job setting screen.
Figure 5B:
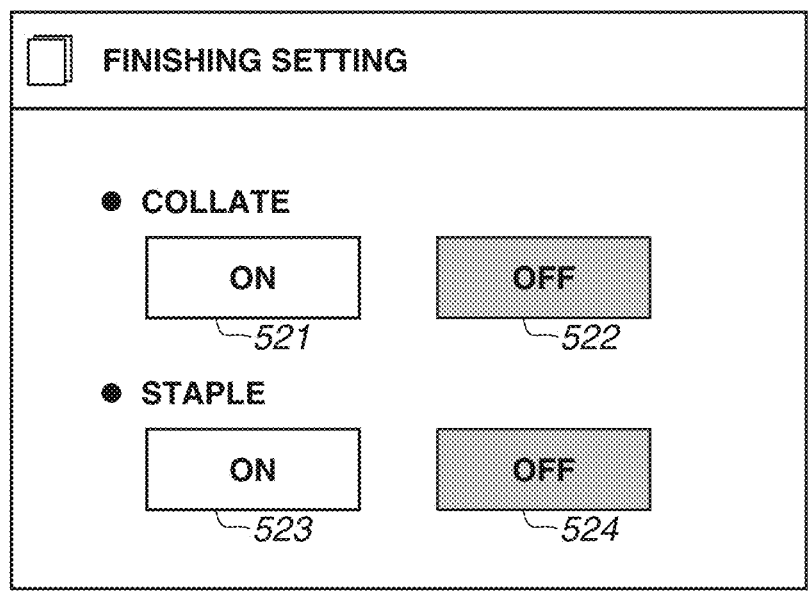

FIG. 5A illustrates an example of the setting screen for executing the copy job, and. the screen is displayed when the copy button 401 is pressed. Buttons 501 to 510 for changing the settings are displayed thereon. Setting values associated with the copy button 401, which are initial setting values (for example, setting values set at the time of shipment from the factory) in the example, are already set on a setting screen 500. If the user wants to change the setting values, for example, the user presses a finishing setting button 501 to display a detailed setting screen such as the one illustrated in FIG. 5B, thereby the user can change the settings such as collating and stapling. The other settings can also be changed in a similar manner. When the user presses a start button 512 after completing the settings, the image processing apparatus 1 executes the job based on the set contents. The change made to the settings is applied only to execution of the job, and it does not mean that the setting values associated with the button are changed.

The example has been described in which the initial screen 400 displays thereon the buttons 401, 402, and 403 with the initial setting values associated therewith, but the displayed buttons are not limited thereto. The initial screen 400 may be configured to display thereon a button (hereinafter referred to as the custom button) that is displayed by the user making the desired settings on the setting screen for executing the job and then manually performing an operation of newly registering a button with the desired settings reflected. therein on the initial screen 100. However, the custom button is not displayed unless the user performs the registration operation, which takes time and effort of the user. Further, there are some users who are unaware of availability of the function of registering the button with favorite setting values associated therewith.

The initial screen 400 may be configured to display thereon a button that executes the job without opening the setting screen or the confirmation screen when being pressed. More specifically, the button displayed on the initial screen 400 can be provided with an attribute for executing the job without opening the setting screen or the confirmation screen, and the button provided with such an attribute allows the job to be executed while omitting the procedure of opening the setting screen or the confirmation screen when being pressed. Referring back to the flowchart illustrated in FIG. 3, the description thereof will be resumed.

In step S303, the job processing unit 203 determines whether an instruction to execute the job corresponding to the button is issued. For example, the job processing unit 203 determines whether the start button 512 is pressed. If the execution instruction is issued (YES in step S303), the processing proceeds to step S304. If the execution instruction is not issued (NO in step S303), the processing in step S303 is repeated. In step S304, the job processing unit 203 executes the job corresponding to the button based on the user's instruction.

In step S305, the job processing unit 203 determines whether the setting values associated with the button have been changed in executing the job in step S304. If the job processing unit 203 determines that the settings have been changed (YES in step S305), the processing proceeds to step S306. If the job processing unit 203 determines that the settings have not been changed (NO in step S305), the processing is ended. If the job has been executed with the values changed from the setting values associated with the button on the screen illustrated in FIG. 5A, the setting values are determined as having been changed, In step S306, the job processing unit 203 stores the setting, values changed from the setting values associated with the button in the setting change history storage unit 205. A setting change history to be stored will be described with reference to FIG. 6.

A table 600 in FIG. 6 indicates the setting values associated with the copy button 401. Three setting items, "stapling", "single-sided/double-sided setting", and "color setting" are used as examples for simplification of the description, but setting items other than these three setting items are also available. Setting values are associated with each of the display objects other than the copy button 401. The setting values associated with the copy button 401 are set to "stapling: OFF", "single-sided/double-sided setting: single-sided", and "color setting: black and white".

A table 610 indicates a button use history of the copy button 401. The table 610 indicates setting values used in previous execution of jobs performed by pressing the copy button 401. Each row corresponds to setting values of a job that has been executed once. For example, data 2 indicates that the user has changed the settings to "stapling: ON" and "single-sided/double-sided setting: double-sided" before executing the job corresponding to the copy button 401. The table 610 indicating the button use history may be stored in the setting change history storage unit 205.

A table 620 indicates the setting change history. Only data in which the setting values associated with the button have been changed is extracted from the button use history, and is stored in the setting change history storage unit 205. For example, in the case of the data 2, information indicating "stapling: ON" and "single-sided/double-sided setting: double-sided" changed from the setting values associated with the copy button 401 is stored in the setting change history storage unit 205. In the case of data 3, the job has been executed with no change made to the setting values associated with the copy button 401, and thus no information is stored in the setting change history storage unit 205.

Referring back to the flowchart illustrated in FIG. 3, the description thereof will be resumed. In step S307, the recommendation determination unit 206 determines whether to generate the recommended button based on the information stored in the setting change history storage unit 205. If the same setting change is made the predetermined number of times or more, the recommendation determination unit 206 determines that the recommended button is to be newly generated with the setting change reflected therein.

Determination about the generation of the recommended button will be described with reference to a table 630 illustrated in FIG. 6. The table 630 indicates a setting change count. The recommendation determination unit 206 handles the setting values changed at the time of execution of each job collectively as a set, and counts the number of times the setting values are changed. to the collectively-handled. set of setting values based on the setting change history. In FIG. 6, an example is illustrated where a user who has previously used the copy button 401 eight times executes the job for the ninth time. The job that the user executes for the ninth time corresponds to data 9 in the table 610. When the user executes the job for the ninth time after changing the setting values of the copy button 401 to "stapling: ON", "single-sided/double-sided setting: double-sided", and "color setting: color", the count corresponding to "stapling: ON", "single-sided/double-sided setting: double-sided", and "color setting: color" in the setting change count is incremented to 4. In other words, the setting change count indicates that the user has made the same setting change four times. In a case where the condition for generating the recommended button is that the setting change count is 4 or more, in step S307, the recommendation determination unit 206 determines to generate the recommended button (YES in step S307). A threshold value for the setting change count does not have to be a fixed value, and may be set individually for each. setting item or the like. For example, in the case of the copy button 401, the setting change count may be counted while adding a greater weight to the stapling setting item, which is less likely to be changed, than that to the single-sided/double-sided setting item, which is more likely to be changed, so that the change to the stapling setting easily leads to the generation of the recommended button, Further, an administrator or a user of the image processing apparatus 1 may be allowed to set the threshold value for the setting change count. The setting change count has been described here citing the setting change count of the copy button 401 as an example, but the setting change count is also stored button by button for other buttons different from the copy button 401. When the setting change count reaches 4 and the recommended button is generated, the count of the corresponding change item may be set back to zero, or counting may be stopped after the count is changed to zero. Further, in the case where the counting is stopped after the count is set back to zero, the count of the corresponding setting item may be restarted if the generated custom button is deleted. Further, the recommendation determination unit 206 may not determine to generate the recommended button if a button with which exactly the same combination of setting values as a recommended button to be generated is associated is already displayed on the initial screen 400 (if such a button has already been generated as the recommended button or has already been registered manually as the custom button) even when the setting change count is 4 or more and satisfies the condition for generating the recommended button.

Figure 7A:
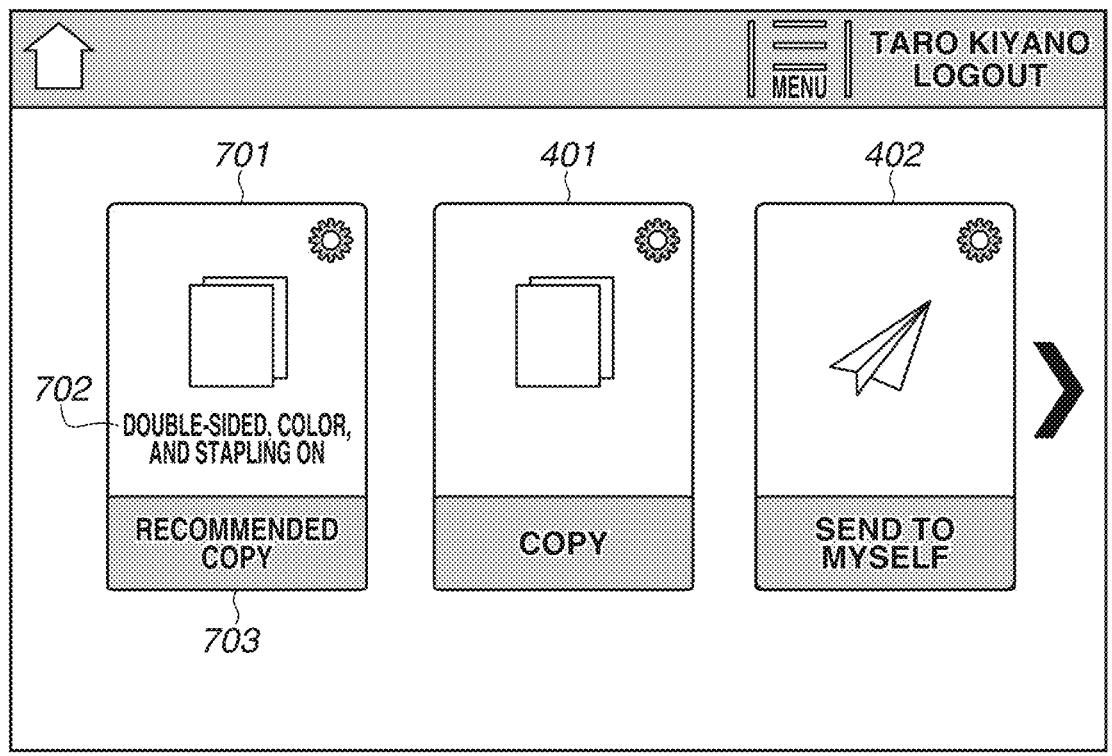
FIGS. 7A and 7B are diagrams each illustrating an operation screen after the recommended button is displayed.
Figure 7B:
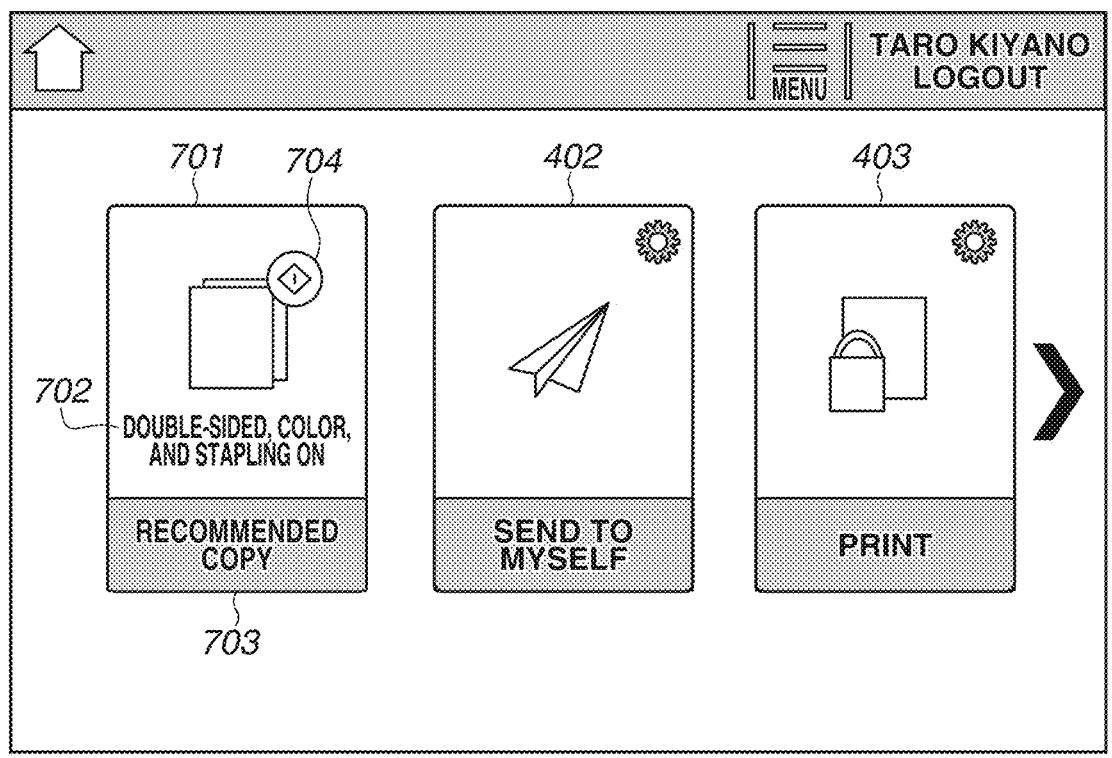

In step S308, the recommended button generation unit 207 generates a recommended button 701 in which the setting change exceeding the threshold value is reflected on the display unit 120. At this time, the recommended button is generated with the setting values of the copy button 401 changed to "stapling: ON", "single-sided/double-sided setting: double-sided", and "color setting: color". Then, the information about the generated recommended button is stored in the button management unit 208. The generated recommended button is displayed on the initial screen 400 as indicated by 701 in FIGS. 7A and 7B. The initial screen 400 may be configured in such a manner that the recommended button is displayed at the top position on the initial screen 400, and thus a print button 403 originally displayed on the first page of the initial screen 400 is moved to the second page as illustrated in FIG. 7A. Alternatively, the initial screen 400 may be configured in such a manner that the recommended button is displayed at the top position of the initial screen 400, and the copy button 401 based on which the recommended button is generated is moved to the second or subsequent page or is removed and no longer displayed on the initial screen 400 as illustrated in FIG. 7B. At this time, the generated recommended button may be a button causing the job to be executed immediately without opening the confirmation screen or the setting screen when being pressed. More specifically, a standard button displayed on the initial screen 400 causes the setting screen to be displayed when being pressed, and then the processing associated with the button is performed when an instruction to change the settings and execute the job is received from the user. On the other hand, the generated recommended button displayed on the initial screen 400 may be set so that the processing associated with the button is performed without undergoing the step of displaying the setting screen or the confirmation screen when being pressed. Because the recommended button is a button with the highly frequently used setting values reflected therein, and thus the user is less likely to further change the settings therefrom to perform the processing, the recommended button is set not to open the setting screen by default when being generated. In this case, an icon that allows the user to understand that the processing will be immediately performed is displayed on the button as indicated by an icon 704. Setting values 702 that correspond to differences between the recommended button 701 and the copy button 401 based on which the recommended button is generated, are displayed on the recommended button 701. Then, a button name 703 that indicates that the button is newly generated is displayed. Alternatively, the recommended button 701 may be set so that an icon or the like indicating that the recommended button 701 is newly generated is displayed thereon.

The setting change history may be stored for each user, and the generated recommended button 701 may be generated and managed for each user identified by the authentication processing unit 201, or the setting change history may be stored collectively for all users and a recommended button common to all the users may be generated.

Advantageous effects of the above-described flowchart will be described below. When the user executes the job with the same setting change made to the button the predetermined number of times or more, a button with the setting change reflected therein is automatically displayed on the menu screen. The user can generate the button with the desired setting values reflected therein by registering the custom button to the menu screen, but the registration takes time and effort of the user and some users may be unaware that the custom button can be registered in the first place. Automatically displaying the recommended. button on the menu screen based on the job execution history as in the present exemplary embodiment allows the user to display the desired button on the menu screen while saving the user time and effort. In the present exemplary embodiment, the settings changed at the time of execution of the job has been handled as one collective set, and the set has been counted, but each setting item may be counted individually. In such a case, when one setting item is changed to the same setting value the predetermined number of times or more, a recommended button with the setting value reflected therein is generated and displayed.

In the first exemplary embodiment, if the number of times that the settings are changed becomes the predetermined number of times or more, the button with the setting change reflected therein is generated and displayed. However, generating the recommended button by using the entire previous setting change history of the user raises a possibility that a recommended button with less frequently used setting values reflected therein is generated. For example, even settings that are less frequently used may have the number of times that the settings are changed that is the predetermined number of times or more as a result of the image processing apparatus I being in use over the long term, thereby the recommended button with the settings reflected therein may be generated.

Thus, the second exemplary embodiment will be described as an example in which a recommended button is generated based on the same setting change made the predetermined number of times within a predetermined period. The present exemplary embodiment has a basic configuration similar to that of the first exemplary embodiment, and thus will be described focusing only on differences.

FIG. 8 illustrates examples of tables indicating a button use history 810, a setting change history 820, and a setting change count 830 according to the present exemplary embodiment. These tables are similar to the tables indicating the button use history 610, the setting change history 620, and the setting change count 630 illustrated in FIG. 6, respectively, but are different in that a date and time of execution of each job is recorded as indicated in columns 840 and 850. The present exemplary embodiment will be described citing an example where a condition is set that, for example, if the same setting change is made four times or more within one month, a recommended button is generated with the setting change reflected therein. The setting change count of "stapling: ON", "single-sided/double-sided setting: double-sided", and "color setting: color" is 4 in FIG. 6, but is 3 in the present exemplary embodiment since the setting changes within one month are counted, thereby the recommended button is not generated. The example in which the setting changes only during the predetermined period are counted has been described, but the setting changes to be counted is not limited thereto. For example, a weight may he added to a recent setting change, so that the recent setting change is more largely reflected in the count.

Generating the recommended button by using the entire previous setting change history as in the first exemplary embodiment raises a possibility that the less frequently used button is displayed on the menu screen. An increase in the number of buttons displayed. on the menu screen makes it difficult for the user to find the desired button. Thus, setting the condition for the generation of the recommended button, as in the present exemplary embodiment, can prevent the less frequently used button from being displayed on the menu screen. In other words, the recommended button can be displayed with high accuracy.

In the second exemplary embodiment, the example has been described in which the recommended button is generated based on the same setting change made the predetermined number of times within the predetermined period. For example, in a case where the threshold value for the number of times is four, the recommended button is generated if the job corresponding to the same button is executed nine times within one month and the same setting change is made four times out of the nine times. On the other hand, the recommended button is also generated even in such a case where the job corresponding to the same button is executed a hundred times within one month and the same setting change is made four times out of the hundred times. In other words, the recommended button is generated even when a ratio of the number of times of the setting change to the total number of times that the job is executed using the same button is low. Thus in the third exemplary embodiment, an example will be described in which the recommended button is generated if a specific setting change is made frequently relative to the total number of times that the job is executed using the same button. The present exemplary embodiment has a basic configuration similar to that of the first exemplary embodiment, and thus will be described focusing only on differences.

In the present exemplary embodiment, an example will be described in which the recommended button is generated if the same setting change is made Y times (for example, four times) out of last X times (for example, five times) that the job corresponding to the button has been executed.

Figure 9:
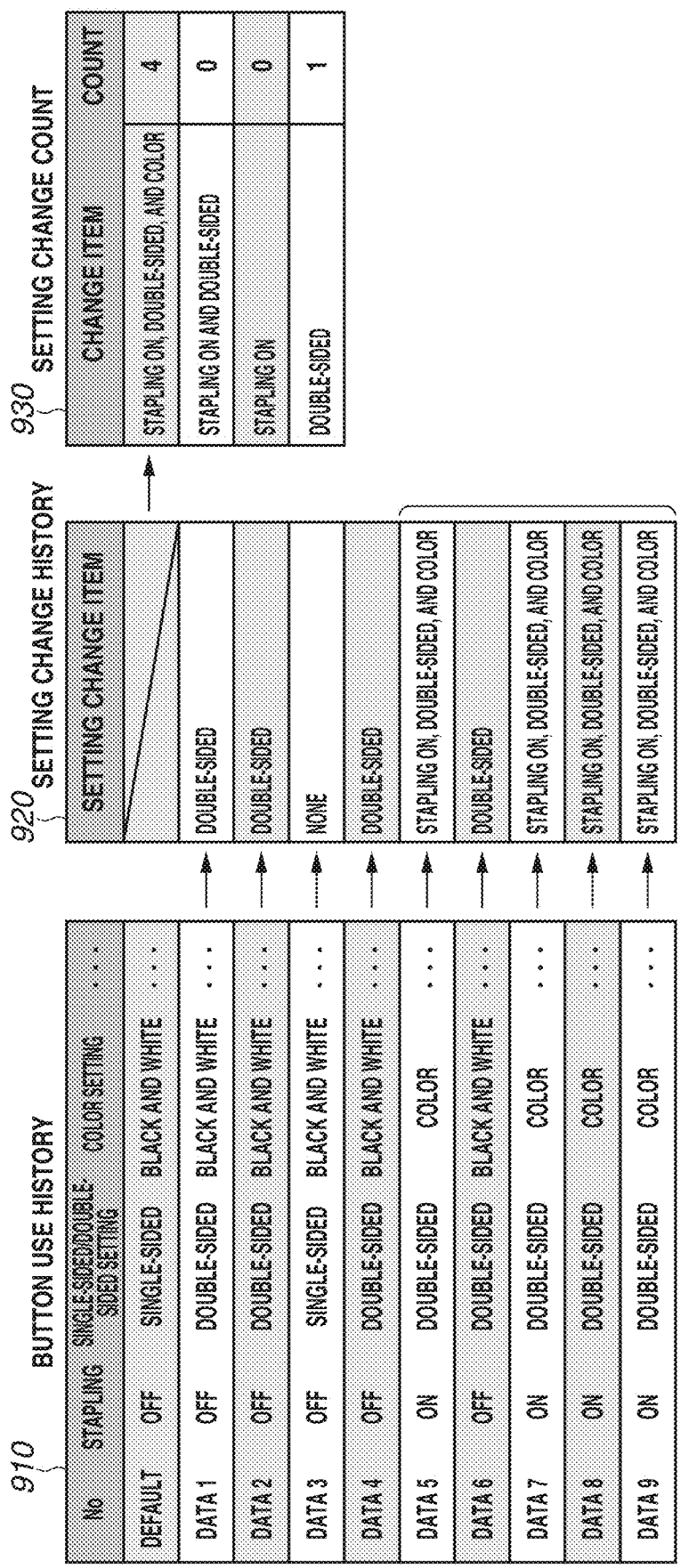
FIG. 9 is a table illustrating a setting change history of the copy button according to one or more aspects of the present disclosure.

FIG. 9 illustrates tables indicating a button use history 910, a setting change history 920, and a setting change count 930 according to the present exemplary embodiment. These tables are similar to the tables indicating the button use history 610, the setting change history 620, and the setting change count 630 illustrated in FIG. 6, respectively, except that the data contained in the tables is changed. The difference from FIG. 6 is that only the setting changes made in the last five times that the job has been executed are counted in the setting change count 93C. In this case, the number of times that the settings have been changed is counted out of the five times that the job has been executed from data 5 to data 9. Because the setting change to "stapling: ON", "single-sided/double-sided setting: double-sided", and "color setting: color" has been made four times, the recommended button is determined to be generated with the setting values reflected therein in step S307. On the other hand, the setting change to "single-sided/double-sided: double-sided"

has been made four times in total, but this setting change has been made only once out of the last five times that the job has been executed, and thus the recommended button is determined not to be generated in step S307.

According to the present exemplary embodiment, the recommended button is generated based on the frequently used setting change among the jobs corresponding to the last predetermined number of times that the job has been executed, and therefore recommendation can be presented with high accuracy.

The condition for generating the recommended button is not limited thereto. For example, the condition may be set in such a manner that, if the number of times that the same setting change is made exceeds the number of times that the job is executed using the setting values associated with the button with no change, the recommended button is generated with the setting change reflected therein. In the above-described exemplary embodiments, the example has been described in which the recommended button is generated based on the button with the initial setting values associated therewith, such as the copy button 401. However, the button based on which the recommended button is generated is not limited to the button with the initial setting values associated therewith, For example, the recommended button may be generated based on a custom button that the user has registered to the menu screen by reflecting the desired settings therein. Further, whether to generate the recommended button may be switched depending on the button in use. For example, whether to generate the recommended button may be switched so that the recommended button is generated if the button to which the setting change is made is the button with the initial setting values associated therewith and is not generated if the button to which the setting change is made is the custom button. Switching the button generation in this manner can prevent recommended buttons from being excessively generated.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and. functions.

This application claims the benefit of Japanese Patent Application No. 2020-145981, filed Aug. 31, 2020, which is hereby incorporated by reference herein in its entirety.

What is claimed is:

1. An image processing apparatus comprising:
   at least one processor and at least a memory coupled to the at least one processor and having instructions stored thereon, and when executed by the at least one processor, acting as:
   a display control unit configured to display a display object on an operation screen, the display object being used to receive an instruction to perform processing, the display object being a display object with a setting value associated therewith;
   a processing unit configured to perform the processing based on the setting value associated with the display object in a case where the instruction to perform the processing corresponding to the display object is issued;
   a storage unit configured to store history information indicating a history of execution of the processing, the history information including at least information indicating the changed setting value in a case where part of the setting value associated with the display object is changed and the processing is performed based on the changed setting value; and
   a control unit configured to, in a case where a number of times the setting value is changed indicated by the history information stored in the storage unit satisfies a predetermined condition, reflect the setting value in the setting value associated with the display object, and newly display, on the operation screen, a display object with which the setting value after reflection is associated.

2. The image processing apparatus according to claim 1, wherein the control unit reflects the setting value changed a predetermined number of times or more in the setting value associated with the display object based on the history information stored in the storage unit, and displays the display object with which the setting value after the reflection is associated.

3. The image processing apparatus according to claim 1, wherein the control unit reflects the setting value changed a predetermined number of times or more during a predetermined period in the setting value associated with the display object based on the history information stored in the storage unit, and displays the display object with which the setting value after the reflection is associated.

4. The image processing apparatus according to claim 1, wherein the control unit reflects the setting value changed a second predetermined number of times or more out of a first predetermined number of times the processing is performed in the setting value associated with the display object based on the history information stored in the storage unit, and displays the display object with which the setting value after the reflection is associated.

5. The image processing apparatus according to claim 1,
   wherein the storage unit stores one or more setting values having been changed as a set, and
   wherein the control unit reflects the set of setting values in the setting value associated with the display object based on the history information stored in the storage unit, and displays the display object with which the setting value after the reflection is associated.

6. The image processing apparatus according to claim 1, wherein the control unit displays the display object with which the setting value after the reflection is associated at a top position of the operation screen.

7. The image processing apparatus according to claim 1, wherein the display object displayed by the control unit causes the processing corresponding to the display object to be performed without displaying a setting screen or a confirmation screen when being pressed.

8. The image processing apparatus according to claim 1, wherein the display control unit displays a plurality of display objects each with the setting value associated therewith, and the storage unit stores the history information for each of the display objects.

9. The image processing apparatus according to claim 1, wherein, in a case where the display object with which the same setting value as the display object that the control unit intends to newly display is associated is already displayed on the operation screen, the display object that the control unit intends to newly display is not displayed on the operation screen.

10. A method for controlling an image processing apparatus, the method comprising:
  displaying an operation screen including a display object, the display object being used to receive an instruction to perform processing, the display object being a display object with a setting value associated therewith;
  performing the processing based on the setting value associated with the display object in a case where the instruction to perform the processing corresponding to the display object is issued;
  storing history information indicating a history of execution of the processing, the history information including information indicating the changed setting value in a case where part of the setting value associated with the display object is changed and the processing is performed based on the changed setting value; and
  in a case where the change to the setting value indicated by the stored history information satisfies a predetermined condition, newly displaying, on the operation screen, a display object with the setting value being reflected in the setting value associated with the display object.

11. An image processing apparatus comprising:
at least one processor and at least a memory coupled to the at least one processor and having instructions stored thereon, and when executed by the at least one processor, acting as:
  a display control unit configured to display a display object on an operation screen, the display object being used to receive an instruction to perform processing, the display object being a display object with a setting value associated therewith;
  a storage unit configured to store history information indicating a history of execution of the processing, the history information including at least information indicating the changed setting value in a case where part of the setting value associated with the display object is changed and the processing is performed based on the changed setting value; and
  a control unit configured to, in a case where a number of times the setting value is changed indicated by the history information stored in the storage unit satisfies a predetermined condition, newly display, on the operation screen, a display object associated with at least the setting value.

12. The image processing apparatus according to claim 11,
  wherein the storage unit stores one or more setting values having been changed as a set, and
  wherein the control unit reflects the set of setting values in the setting value associated with the display object based on the history information stored in the storage unit, and displays the display object with which the setting value is associated.

13. The image processing apparatus according to claim 11, wherein the display control unit displays a plurality of display objects each with the setting value associated therewith, and the storage unit stores the history information for each of the display objects.

14. A method for controlling an image processing apparatus, the method comprising:
  displaying an operation screen including a display object, the display object being used to receive an instruction to perform processing, the display object being a display object with a setting value associated therewith;
  storing history information indicating a history of execution of the processing, the history information including information indicating the changed setting value in a case where part of the setting value associated with the display object is changed and the processing is performed based on the changed setting value; and
  in a case where the change to the setting value indicated by the stored history information satisfies a predetermined condition, newly displaying, on the operation screen, a display object associated with at least the setting value.

* * * * *